Patented Oct. 25, 1949

2,486,281

UNITED STATES PATENT OFFICE 2,486,281

ARC CUTTING OF METAL AND ELECTRODE THEREFOR

Curtis R. Henry, Youngstown, Ohio, assignor to Valley Mould and Iron Corporation, Hubbard, Ohio, a corporation of New York No Drawing. Application December 22, 1948, Serial No. 66,853

14 Claims. (Cl. 219—15)

This invention relates to the electric arc cutting of metals and more particularly to such cutting of cast iron and castings made from molten ferrous metal direct from a blast furnace, such metal being known in the iron and steel industry as "direct metal." The invention also is primarily concerned with the application of the cutting method in the manufacture of cast iron or direct metal ingot moulds and stools used in industry for the casting of metallic ingots.

An electric arc cutting method is essentially a method in which the metal is fused by the heat of the arc to form a kerf or cut through the piece, the molten metal flowing from the cut. The use of the electric arc to cut a wide variety of steel products, either cast, rolled or forged, has proved very satisfactory and has obtained wide acceptance. Repeated attempts to apply the methods normally used on steel to the cutting of cast iron have produced negligible cutting action and it is conceded in the industry that electric arc cutting is not feasible as a method for cutting cast iron. The difficulty in cutting cast iron with an electric arc is believed due to the presence of free carbon in the form of graphite flakes throughout the metal, which flakes fail to fuse, burn or vaporize readily and make for very slow cutting. Previous attempts to cut cast iron have failed because of the inability to achieve a cutting rate sufficiently fast to keep the kerf clear. The difficulties experienced in the cutting of cast iron are greatly intensified when dealing with direct metal. Direct metal has an even higher content of free graphite than cast iron and this has created a barrier to arc cutting of this material which is generally considered by the industry to be insurmountable.

My process, however, has broken this seemingly insurmountable barrier. I have found that both cast iron and direct metal castings may be cut at a satisfactory and commercially feasible rate by maintaining a steady cutting arc of extreme heat intensity. Such a cutting arc is obtained through the use of greatly increased power capacity over that required for standard welding or cutting operations, obtaining therefrom abnormally high amperage and voltage in relation to the size of the electrode, and the cutting speed is maintained at a reasonably rapid rate so that the molten metal is carried from the cut before solidifying.

Actual use of the method shows that the rapidity of cutting is somewhat dependent upon the mass of metal adjacent the cut and actual experience shows the cutting rate to vary from 1 square inch to 7 square inches per minute, dependent also upon the character of the material being cut and the amount of amperage used.

The present invention is particularly suited for the finishing of cast ferrous ingot moulds and stools, which are often cast from direct metal. The cutting and trimming of these moulds and stools by oxyacetylene cutting methods has been completely unsatisfactory as also has been the application of arc cutting processes conventionally associated with the cutting of steel. Therefore, it has been necessary to trim these moulds and stools by use of an air hammer and cold chisel, a slow, costly and hazardous operation. The present process provides an economical means for trimming and smoothing the castings so as to remove surplus metal and eliminates the delay, waste and danger of the chipping operation.

An object of the present invention is to provide an improved method for cutting cast iron and direct metal castings.

Another object is to provide an improved method for the trimming, smoothing and finishing of ingot moulds and stools, and to provide an improved mould and stool in which surface imperfections have been trimmed and smoothed by this method.

This electric arc cutting method is preferably carried out using direct current and reverse polarity, the electrode being positive and the work negative, one side of the line being connected with the work and the other side of the line being connected with the electrode. Straight polarity can be used but gives a lower cutting rate for any given current setting. Alternating current may also be used.

Using a ¼ inch electrode, the amperage for the preferred method should be at least 300 amperes, and the amperage is increased, dependent on the thickness of the material, whether cast iron or direct metal is being cut, and the cutting speed desired. Thicker sections require higher amperage and direct metal castings also require higher amperage if the same cutting speed as in cutting cast iron is to be maintained. A current strength of 400–600 amperes is preferable in most cutting operations. At about 700 amperes, when using present commercially available coated ¼ inch electrodes, the electrode coating begins to fail so that 800 amperes is about the practical upper limit for manual operation. Above this limit the amount of heat evolved makes manual operation uncomfortable and hazardous to the operator.

The electrode arc voltage for this method preferably should be within the range of 35 to 60 volts, this voltage being adjusted to get the desired amperage within the stated limits for proper cutting.

I have successfully cut cast iron and direct metal castings as thick as 8½ inches with this method by the use of a ¼ inch diameter mild steel electrode having a heavy electrically nonconductive refractory coating, which may be about ⅛ of an inch in thickness.

I have also found that carbon electrodes of approximately this size are not suitable for use with this method unless the electrode is properly coated or otherwise protected against failure arising from the high amperage employed.

The size of the electrode may be varied somewhat provided that the current is adjusted accordingly, the current being varied more or less as a direct function of the electrode cross-sectional area. Generally speaking, to maintain a satisfactory current density, the amperage must be maintained at least 5,000 times the square inch cross-sectional electrode area and more effective cutting is obtained, particularly of direct metal, by using a current from 7,000 times to 10,000 times this area.

In making a cut according to this method, the electrode is preferably held generally perpendicular to and relatively close to the work and moved back and forth along the cut, the force of the arc pushing the molten metal along in advance of the electrode. Preferably, the piece being cut is so positioned that the molten metal will flow freely from the cut.

While I am unable to explain with certainty the principle of operation of this method, I believe that the application of high current through the coated rod or electrode results in an arc of such intensity as to readily fuse, burn or vaporize the graphite flakes. The intense cutting effect is created by the intense heat concentration and the high current density at the point of contact of the arc, resulting from the abnormally high amperage and voltage used and from the presence of the coating on the rod or electrode. The coating serves a multipurpose. First, by melting more slowly than the core it focuses the arc heat and prevents side-arcing. Secondly, since the coating is substantially nonconductive, it tends to concentrate and maintain the density of current flow in the arc, and where the electrode is a rod the crater formed within the tubular end of the coating by the slower fusing of the coating focuses this current upon the kerf. Finally, it provides a source of active gas which both shields the arc from the atmosphere and reacts with the work metal to aid the cutting.

The chemical composition of the electrode coating appears to affect the cutting action. An extremely refractory nonconductive coating of the electrode is especially desirable to carry out this process. As a preferred example, a suitable electrode coating of this type may be formed of finely ground alumina and Carborundum in any proportions, together with a binder. Water glass forms a satisfactory binder. Preferably, the coating is formed principally of Carborundum to improve its refractory nature. As a more specific preferred example:

*Mix "A"*

Mix intimately the ingredients ground to #100 mesh

| | Percent |
|---|---|
| Carborundum (SiC) | 80 |
| "Grog," i. e., ground refractory fire-clay brick | 20 |

*Solution "B"*

| | Percent |
|---|---|
| Water-glass (NaSiO$_3$) | 15 |
| Water (H$_2$O) | 85 |

All percentages are by weight. To the required batch quantity of "A," add sufficient of solution "B" to make a paste of the proper consistency to coat the rod by dipping or extrusion.

The coatings of the electrodes may vary from the preferred example; as, for instance, a coating of silica, titanium oxide and manganese hydroxide with a binder of sugar solution, molasses or glycerine; or a coating of sand or ground mica schist and commercial ferro-manganese in equal proportions with a binder of water glass. In fact, any coating of the electrode which is substantially an electrical insulator and which is sufficiently refractory to withstand the heat of the arc may be used in carrying out this method.

Materials can be incorporated in the coating to produce an exothermic reaction when heated by the arc, thus contributing to the heat of the arc and the speed of cutting. If an oxide-free cut is desired, the arc may be made reducing in character by the incorporation of materials, which, when heated by the arc, produce carbon monoxide or some other reducing agent. If freedom from oxidation is of no consequence, as in cutting scrap, oxygen liberating chemicals together with fluxes may be used to contribute to the speed of the cutting operation.

The above-described method is particularly advantageous in the trimming and finishing of ingot moulds and stools used in industry for the casting of metallic ingots, both ferrous and nonferrous. These ingot moulds and stools are frequently cast from direct metal and are very heavy castings, the moulds generally weighing several tons each. In the casting of these moulds, fins are very frequently formed, usually adjacent to the bottom of the moulds, and other surface irregularities occur which must be removed before the moulds may be used satisfactorily to cast ingots. The stools for use with moulds often have interlocking members for engaging casting buggies, and these as well as fins and other surface irregularities may require trimming before being usable.

In usual practice, these defects and irregularities are corrected by cutting away the excess metal with chipping hammers or with a chisel and sledge, processes slow, laborious and hazardous to the workmen. By using the above-outlined arc cutting method, employing ¼ inch mild steel electrode having a heavy refractory coating and utilizing a current of about 600 amperes and 45–50 volts, I have successfully cut protrusions of large cross section from moulds and stools cast from direct metal. The cutting surface formed by cutting off a fin is usably smooth but may be further smoothed by playing the arc rapidly back and forth across the cutting surface so as to fuse the surface and smooth out imperfections. This same smoothing may be employed in cutting off small protrusions on the mould or stool.

The invention is clearly defined in the appended claims, which are to be given the broadest meaning consistent with the above description and with the concept of this invention as distinguished from the pertinent prior art.

I claim:

1. The method of cutting ferrous metal castings having carbon present in the form of free graphite throughout the metal, comprising subjecting the metal to the cutting effect of the electric arc from a coated ferrous electrode operated at an amperage of at least 300 amperes.

2. The method of cutting ferrous castings having carbon present in the form of graphite flakes throughout the metal, comprising subjecting the metal to the cutting effect of the electric arc from a mild steel electrode rod having an electrically nonconductive refractory coating and operated at an amperage between 400 and 600 amperes.

3. The method of cutting direct metal castings, comprising subjecting the castings to the cutting effect of the electric arc from a ferrous electrode having an electrically nonconductive refractory coating and operated at an amperage of at least 400 amperes and an arc voltage between 35 and 60 volts.

4. The method of cutting direct metal castings, comprising subjecting the castings to the cutting effect of the electric arc from a mild steel electrode rod having an electrically nonconductive refractory coating and operated at a current of at least 400 amperes and a voltage between 35 and 60 volts.

5. The method of cutting direct metal castings, comprising subjecting the castings to the cutting effect of the electric arc from a mild steel electrode having an electrically nonconductive refractory coating and operated at a current between 400 and 800 amperes and an arc voltage between 35 and 60 volts.

6. The method of cutting ferrous metal castings having carbon present in the form of graphite flakes throughout the metal, comprising subjecting the metal to the cutting effect of the electric arc from a ferrous electrode having an electrically nonconductive refractory coating and operated at an amperage of at least 5000 times the square inch cross-sectional area of the electrode.

7. The method of cutting direct metal castings, comprising subjecting the castings to the cutting effect of the electric arc from a coated ferrous electrode operated at an amperage of between 7,000 and 10,000 times the square inch cross-sectional area of the electrode.

8. The method of removing imperfections, such as fins and the like, from cast ferrous metal ingot moulds and stools, comprising subjecting the said imperfections to the cutting action of an electric arc from a ferrous electrode having a refractory electrically nonconductive coating and operated at an amperage of at least 400 amperes.

9. The method of removing imperfections, such as fins and the like, from cast ferrous metal ingot moulds and stools, comprising subjecting the said imperfections to the cutting action of the electric arc from a mild steel electrode rod having a refractory coating and operated with a current of at least 400 amperes and a voltage between 35 and 60 volts.

10. The method of removing imperfections, such as fins and the like, from ingot moulds and stools formed of direct metal, comprising subjecting the said imperfections to the cutting action of the electric arc from a ¼ inch ferrous electrode rod having an electrically nonconductive refractory coating and operated at a current of between 400 and 700 amperes and between 35 and 60 volts.

11. A coated mild steel electrode for the arc cutting of cast ferrous metal, the coating consisting essentially of a finely ground mixture of about 80% Carborundum and about 20% alumina held together by a binder.

12. A coated mild steel electrode for the arc cutting of cast ferrous metal, the coating consisting essentially of a finely ground mixture of Carborundum and alumina held together by a binder of sodium silicate, the Carborundum comprising the major portion of the coating.

13. A coated ferrous electrode for the arc cutting of cast ferrous metal, the coating consisting essentially of a finely ground mixture of about 80% Carborundum and about 20% pulverized firebrick held together by sodium silicate as a binder.

14. The method of cutting ferrous castings having carbon present in the form of free graphite throughout the metal, comprising subjecting the metal to the cutting effect of the electric arc from a mild steel electrode rod having a coating consisting essentially of a finely ground mixture of about 80% Carborundum and about 20% alumina held together by sodium silicate as a binder, the electrode being operated at a current of between 400 and 700 amperes.

CURTIS R. HENRY.

REFERENCES CITED

The following references are of record in the file of this patent:

UNITED STATES PATENTS

| Number | Name | Date |
|---|---|---|
| 1,556,325 | Grumpelt | Oct. 6, 1925 |
| 1,738,246 | Holt | Dec. 3, 1929 |
| 2,059,236 | Holslag | Nov. 3, 1936 |
| 2,077,397 | Christensen | Apr. 20, 1937 |
| 2,284,351 | Wyer | May 26, 1942 |
| 2,411,522 | Chevigny | Nov. 26, 1946 |